(12) United States Patent
Ohwada et al.

(10) Patent No.: US 7,134,071 B2
(45) Date of Patent: Nov. 7, 2006

(54) DOCUMENT PROCESSING UTILIZING A VERSION MANAGING PART

(75) Inventors: Toshikazu Ohwada, Tokyo (JP); Katsumi Kanasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 346 days.

(21) Appl. No.: 10/299,834

(22) Filed: Nov. 20, 2002

(65) Prior Publication Data

US 2003/0115547 A1  Jun. 19, 2003

(30) Foreign Application Priority Data

Nov. 21, 2001 (JP) .............................. 2001-356160
Nov. 5, 2002 (JP) .............................. 2002-321629

(51) Int. Cl.
*G06F 15/00* (2006.01)
(52) U.S. Cl. ........................ 715/511; 715/526; 715/530
(58) Field of Classification Search ................ 715/511, 715/530, 526
See application file for complete search history.

(56) References Cited

U.S. PATENT DOCUMENTS 5,734,899 A    3/1998  Yoshizawa et al.
5,765,176 A *  6/1998  Bloomberg .................. 715/514
5,819,295 A * 10/1998  Nakagawa et al. ......... 707/203
2004/0027604 A1* 2/2004  Jeran et al. ................. 358/1.14

FOREIGN PATENT DOCUMENTS

EP   0 492 071 A2   7/1992
JP   8-44718        2/1996

* cited by examiner

*Primary Examiner*—Stephen Hong
*Assistant Examiner*—Kristina Honeycutt
(74) *Attorney, Agent, or Firm*—Dickstein Shapiro LLP

(57) ABSTRACT

When there are the same contents (content data) of a document among versions, the contents of the document are shared so as to reduce the storage area. Accordingly, instead of accumulating content data separately for each version, each version is related to the content data accumulated in the storage area shared among the versions. When a document α has versions 1 through 3 and each of versions 1 through 3 has sections 1 and 2, three sections 1 of the versions 1 through 3 share content data 1 and the section 2 of each of the versions 1 through 3 has different content data 2, 3, or 4. The content data 1, 2, 3, or 4 indicated by version information are searched for from a content data DB, to be edited. Only when the content data 1, 2, 3, or 4 are changed, new content data are registered.

10 Claims, 10 Drawing Sheets

FIG.2A

BIBLIOGRAPHY INFORMATION DB

| DOCUMENT ID | DOCUMENT NAME & OTHERS |
|---|---|
| 1 | α |
| 2 | β |
| ... | ... |

FIG.2B

VERSION INFORMATION DB

| VERSION ID | VERSION NUMBER | DOCUMENT ID | CONTENT ID |
|---|---|---|---|
| 1 | 1 | 1 | 1 |
| 2 | 2 | 1 | 1 |
| 3 | 3 | 1 | 2 |
| 4 | 1 | 2 | 4 |
| ... | ... | ... | ... |

FIG.2C

CONTENT DATA DB

| CONTENT ID | DATA |
|---|---|
| 1 | 0110010110 |
| 2 | 100100100 |
| 3 | 010111001 |
| 4 | 000101 |
| ... | ... |

FIG.4A

BIBLIOGRAPHY INFORMATION DB

| DOCUMENT ID | DOCUMENT NAME &OTHERS |
|---|---|
| 1 | α |
| 2 | β |
| ... | ... |

FIG.4B

VERSION INFORMATION DB

| VERSION ID | VERSION NUMBER | DOCUMENT ID |
|---|---|---|
| 1 | 1 | 1 |
| 2 | 2 | 1 |
| 3 | 3 | 1 |
| 4 | 1 | 2 |
| ... | ... | ... |

FIG.4C

SECTION INFORMATION DB

| SECTION ID | SECTION NUMBER | VERSION ID | CONTENT ID |
|---|---|---|---|
| 1 | 1 | 1 | 1 |
| 2 | 2 | 1 | 2 |
| 3 | 1 | 2 | 1 |
| 4 | 2 | 2 | 3 |
| ... | ... | ... | ... |

FIG.4D

CONTENT DATA DB

| CONTENT ID | DATA |
|---|---|
| 1 | 0110010110 |
| 2 | 100100100 |
| 3 | 010111001 |
| 4 | 000101 |
| ... | ... |

FIG.6

| OBJECT ID | OBJECT TYPE | VERSION ID | CONTENT ID |
|---|---|---|---|
| 1 | TEXT | 1 | 1 |
| 2 | DRAWING | 1 | 2 |
| 3 | DRAWING | 1 | 3 |
| 4 | TEXT | 2 | 1 |
| 5 | DRAWING | 2 | 2 |
| 6 | DRAWING | 2 | 4 |
| 7 | TEXT | 3 | 1 |
| 8 | DRAWING | 3 | 5 |
| 9 | DRAWING | 3 | 4 |
| ... | ... | ... | ... |

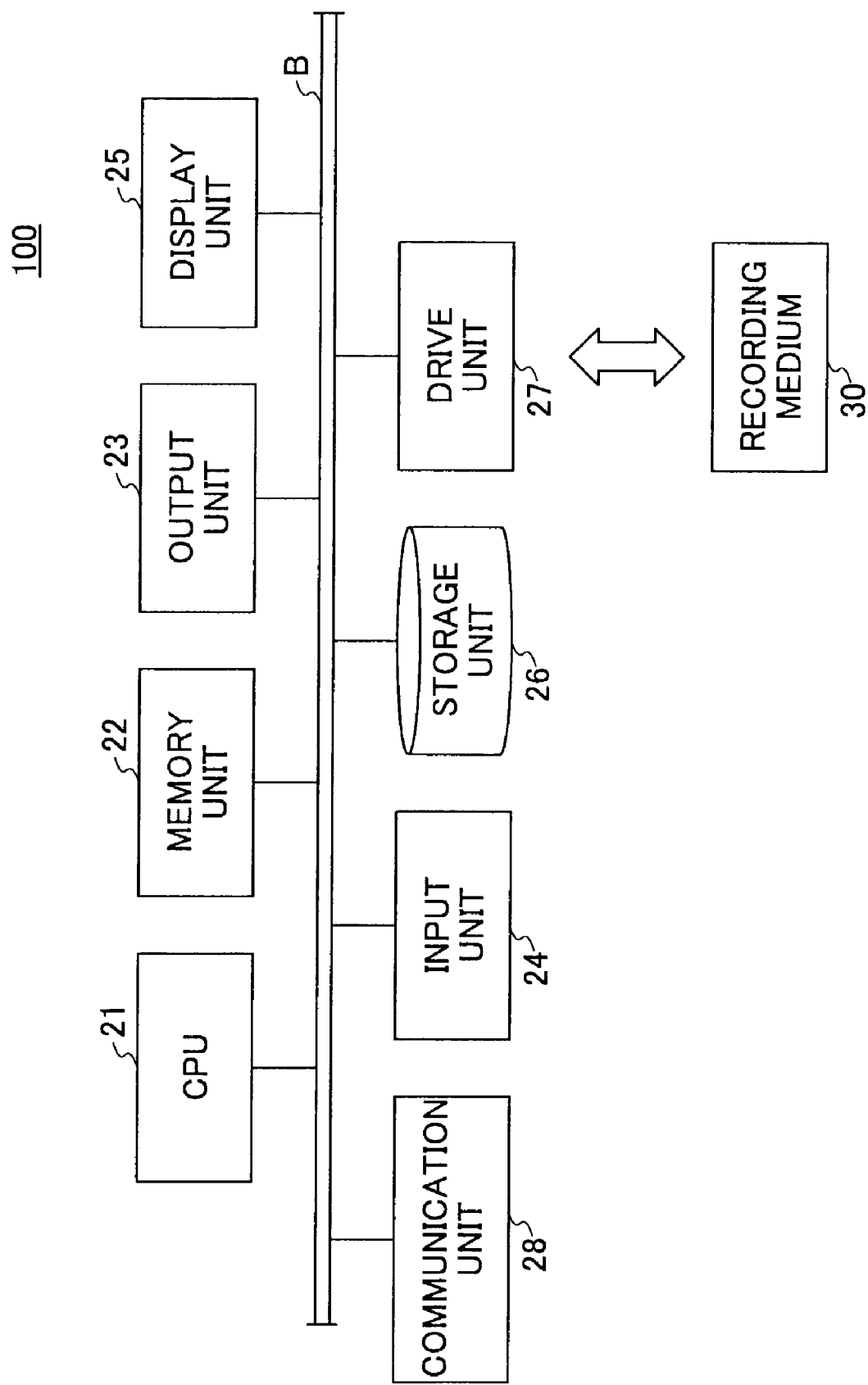

DOCUMENT PROCESSING UTILIZING A VERSION MANAGING PART

BACKGROUND OF THE INVENTION

1. Field of the Invention

The present invention generally relates to document processing apparatuses for processing documents having a plurality of versions, and more particularly to a document processing apparatus that unifies management of document contents (content data) of each version to share the document contents in a case in which the same document contents exist between different versions, so that a storage area can be reduced.

2. Description of the Related Art

Recently, to manage documents and images that are newly created, edited, processed, or the like based on one document or one image, sharing contents of the document or the image has become more common. Regarding this, for example, Japanese Laid-Open Application No. 8-44718 discloses a method for sharing document components among different documents.

Alternatively, managing the contents of the documents or the images by different versions is a widely used procedure. In this version management, components having the same contents are shared among different versions. Therefore, it is possible to reduce the storage area required to store the contents, and to reduce the workload necessary for processing the document or the image.

However, there are problems as follows if only version management is conducted. For example, if only the content data, which are relatively a greater amount than bibliography data, are managed for each version, the storage area cannot be effectively utilized. Even if the contents of the document are not changed when the document is edited, the number of versions is increased after the document is edited. In this case, the contents of the document are stored as additional contents, in spite of being the same as before being edited. Accordingly, extra storage area is used.

SUMMARY OF THE INVENTION

It is a general object of the present invention to provide document processing apparatuses in which the above-mentioned problems are eliminated.

A more specific object of the present invention is to provide a document processing apparatus in that when contents of a document or an image exist among different versions, the contents are shared among the different versions, so as to realize a reduction of storage area by a simple configuration.

The above objects of the present invention are achieved by a document processing apparatus for managing a document having a plurality of versions, including: a version managing part managing the plurality of versions so as to share actual data showing contents of the document among the plurality of versions for each document; and a working version creating part obtaining the actual data from said version managing part by document identification information identifying the document and version identification information identifying the version, and reproducing the contents of the document as a working version, wherein said version managing part manages the document so as to share the actual data as a new version based on a change state of the document that is enabled to be changed by said working version creating part.

In the document processing apparatus according to the present invention, a single document is related to the plurality of versions, and the contents of the document are reproduced based on the document identification information and the version identification information. Thus, the contents of the document can be shared among the plurality of versions. That is, the contents of the document, which are a relatively greater amount than bibliography data, can be shared among the plurality of versions. Therefore, it is possible to reduce the storage area storing the actual data showing the contents of the document.

Moreover, the version managing part may include a bibliography information managing part managing bibliography information showing a bibliography for each document; a version information managing part, which is related to said bibliography information managing part by the document identification information, managing actual data identification information identifying the actual data specified by the document identification information and a version number; and an actual data managing part, which is related to said version information by the actual data identification information, managing the actual data.

In the document processing apparatus according to the present invention, since the version information managing part is related to the actual data managing part, even if different document identification information and a different version number are combined, it is possible to specify the same actual data by that combination.

Furthermore, the version managing part may manage the plurality of versions so as to share the actual data of the document among the plurality of versions for each of a plurality of sections configuring the document. Also, the version managing part may include: a bibliography information managing part managing bibliography information showing a bibliography for each document; a version information managing part, which is related to said bibliography information managing part by the document identification information, managing the document identification information and a version number by document version specification information specifying a combination of the document identification information and the version number; a section information managing part managing a correspondence between each of the sections and the actual data so as to indicate actual data identification information identifying the actual data by each section number of the plurality of sections configuring the document and the document version specification information; and an actual data managing part, which is related to said section information managing part by the actual data identification information, managing the actual data.

In the document processing apparatus according to the present invention, since the contents of the document are managed by each of sections configuring the document so that the contents of the document can be shared by segmented units, it is possible to flexibly share the contents of the document and to further reduce the storage area.

Moreover, the version managing part may manage the plurality of versions so as to share the actual data of the document among the plurality of versions for each of a plurality of objects configuring the document. Also, the version managing part may include: a bibliography information managing part managing bibliography information showing a bibliography for each document; a version information managing part, which is related to said bibliography information managing part by the document identification information, managing the document identification information and a version number by document version specification information specifying a combination of the document identification information and the version number; an object information managing part corresponding and managing each type of the plurality of objects configuring the document, said document specification information, and actual data identification information identifying the actual data; and an actual data managing part, which is related to said object information managing part by the actual data identification information, managing the actual data.

In the document processing apparatus according to the present invention, since the contents of the document are managed by each of objects configuring the document so that the contents of the document can be shared by segmented units, it is possible to flexibly share the contents of the document and to further reduce the storage area The object may be a data unit that is segmented by each of different data formats such as text, an image, and the like.

Furthermore, the document processing apparatus may include a working version registering part registering document identification information identifying the document and version identification information identifying the version as a working version of the document, wherein said working version creating part reproduces and registers the contents of the document in response to an edit request specifying the document and the version.

In the document processing apparatus according to the present invention, instead of registering as working data the actual data showing the content of the document that are reproduced to create a working version to be edited, only the document identification information and the version identification information are registered as a new version. Therefore, even in working with the new version of the document, the contents of the document can be shared. And it is possible to suppress increasing the storage area for editing the contents of the document and then to reduce the storage area.

Moreover, the document processing apparatus may include a change determining part determining whether or not the contents of the document reproduced by said working version creating part are changed; and a new version registering part registering a new version to said version managing part, wherein when said change determining part determines that the contents of the document are not changed, said new version registering part registers said new version to said version managing part so as to relate the new version to the actual data used when the working version creating part reproduces the document.

In the document processing apparatus, when only the bibliography information is changed, the new version is managed so as to share the actual data of the working version that is edited.

Furthermore, when the said change determining part determines that the contents of the document are changed, said new version registering part may register the new version to the said version managing part so as to relate the new version to new actual data after the actual data are changed.

In the document processing apparatus, when the contents of the document are changed, the new version is managed so as to relate to the changed actual data as new actual data.

The above objects of the present invention can be achieved by a program code for causing a computer to conduct processes described above in the document processing apparatus or by a computer-readable recording medium recorded with the program code.

BRIEF DESCRIPTION OF THE DRAWINGS

In the following, embodiments of the present invention will be described with reference to the accompanying drawings.

FIG. 2A is a diagram showing a bibliography information DB to realize the first version management structure shown in FIG. 1 according to an embodiment of the present invention, FIG. 2B is a diagram showing a version information DB to realize the first version management structure shown in FIG. 1 according to an embodiment of the present invention, and FIG. 2C is a diagram showing a content data DB to realize the first version management structure shown in FIG. 1 according to an embodiment of the present invention;

FIG. 4A is a diagram showing a bibliography information DB to realize the second version structure shown in FIG. 3 according to an embodiment of the present invention, FIG. 4B is a diagram showing a version information DB to realize the second version management structure shown in FIG. 3 according to an embodiment of the present invention, FIG. 4C is a diagram showing a section information DB to realize the second version structure shown in FIG. 3 according to an embodiment of the present invention, and FIG. 4D is a diagram showing a content data DB to realize the second version structure shown in FIG. 3 according to an embodiment of the present invention;

FIG. 6 is a diagram showing an object database to realize the third version management structure shown in FIG. 5;

FIG. 10 is a block diagram showing a hardware configuration of the document processing apparatus according to the present invention.

DESCRIPTION OF THE PREFERRED EMBODIMENTS

In the following, a document processing apparatus according to an embodiment of the present invention will be described with reference to the accompanying drawings.

In the document processing apparatus capable of processing a document having a plurality of versions, according to the embodiment of the present invention, when the same contents of the document (content data) exist among different versions, the contents of the document are shared, so that the storage area is reduced.

Accordingly, in this embodiment, instead of separately storing the content data for each version, the content data, which are stored in a shared storage area among different versions, are related to version information, the content data indicated based on version information is searched, and then data to be processed are read.

A version management structure basic to apply the above-mentioned method will be described.

Figure 1:
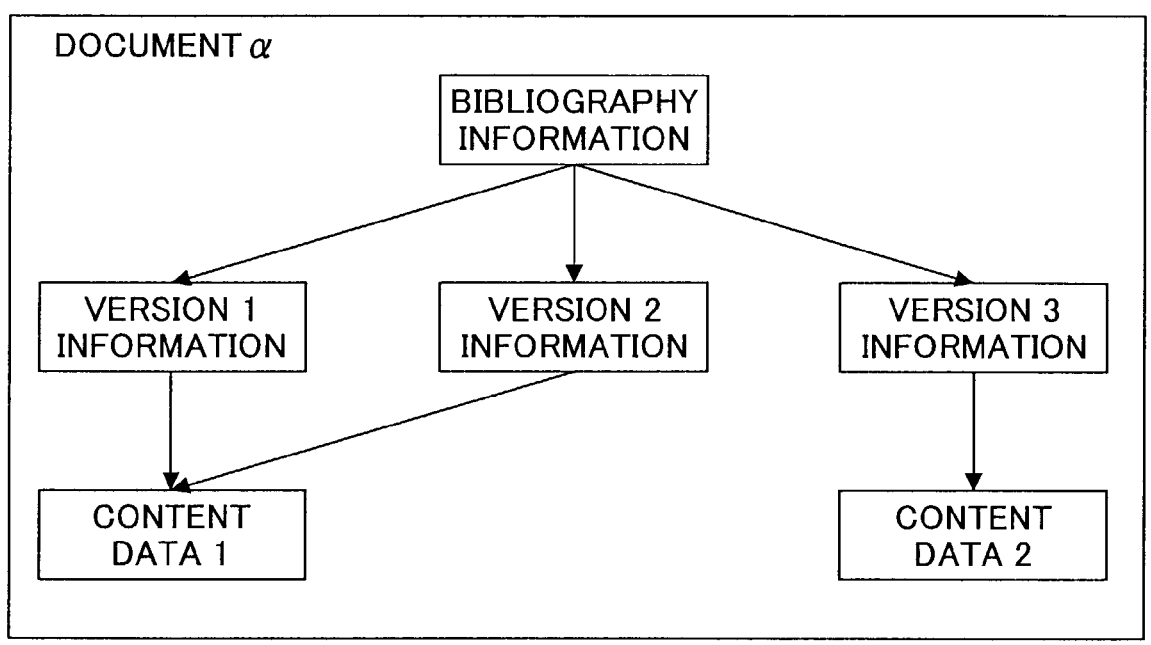
FIG. 1 is a block diagram showing a first version management structure in a document (document α) according to an embodiment of the present invention.

FIG. 1 is a block diagram showing a first version management structure in a document (document α). FIG. 2A through FIG. 2C are diagrams showing databases realizing the first version management structure shown in FIG. 1.

As shown in FIG. 1, the first version management structure of the document α illustrated as a document having the plurality of versions includes three versions, a version 1 through a version 3 for the document α. The version 1 and the version 2 share content data 1 and the version 3 includes content data 2. That is, it is shown that the document α is a document having the plurality of versions because of version 1 information showing information concerning the version 1, version 2 information showing information concerning the version 2, and version 3 information showing information concerning the version 3, which are related to bibliography information. The version 1 and the version 2 share the same content data 1 because the content data 1 are related to the version 1 information and the version 2 information. Also, the version 3 has the content data 2 that is different from the content data 1 for the version 1 and the version 2 because the content data 2 are related to the version 3 information.

The first version management structure of the document α is ruled by databases (tables) of a bibliography information DB shown in FIG. 2A, a version information DB shown in FIG. 2B, and a content data DB shown in FIG. 2C. The bibliography information DB shown in FIG. 2A includes items such as a document ID specifying a document, a document name & others showing a document title and others, and the like. The version information DB shown in FIG. 2B includes items such as a version ID identifying a record of the version information, a version number, the document ID, a content ID identifying the contents of the document, and the like. The content data DB shown in FIG. 2C includes items such as the content ID, the data, and the like. For example, the data are actual content data and binary data.

In FIG. 2A through FIG. 2C, the bibliography information DB and the version information DB are related to each other by the document ID, and the version information DB and the content data DB are related to each other by the content ID.

A document ID "1" and a document name "α" in the bibliography information DB shown in FIG. 2A correspond to the bibliography information. Also, a version ID "1", a version number "1", a document ID "1", and a content ID "1", which are shown in FIG. 2B and related to the document ID "1", correspond to the version 1 information shown in FIG. 1. A version ID "2", a version number "2", the document ID "1", and the content ID "1"correspond to the version 2 information shown in FIG. 1. The version ID "3", the version number "3", the document ID "1", and the content ID "2" correspond to the version 3 information shown in FIG. 1. Moreover, the content ID "1" and data "0110010110", which are shown in FIG. 2C related to the content ID "1", correspond to the content data "1" shown in FIG. 1, and the content ID "2" and data "100100100", which are shown in FIG. 2C and related to the content ID "2", correspond to the content data 2 shown in FIG. 1.

The document ID of the document α is "1" as shown in the table in the bibliography information DB (FIG. 2A), and each version of the document is shown as the version number (1, 2, 3, . . . ) in the table in the version information DB (FIG. 2B) Accordingly, it is possible to indicate the content data, which are related to a version of a specific document, by indicating the document and the version number. In this case, since the content data can be shared, the content data are retrieved and utilized by referring to the content data DB (FIG. 2C) by using the content ID. It should be noted that an item shown as "ID" in each table of the databases shown in FIG. 2A through FIG. 2C is a number to identify a unique record in each table.

A second version management structure will be described.

In the first version management structure, it is assumed that the content data can be shared with all versions of the document. In the second version management structure, it is assumed that the contents of the document are shared with a section that configures the document.

Figure 3:
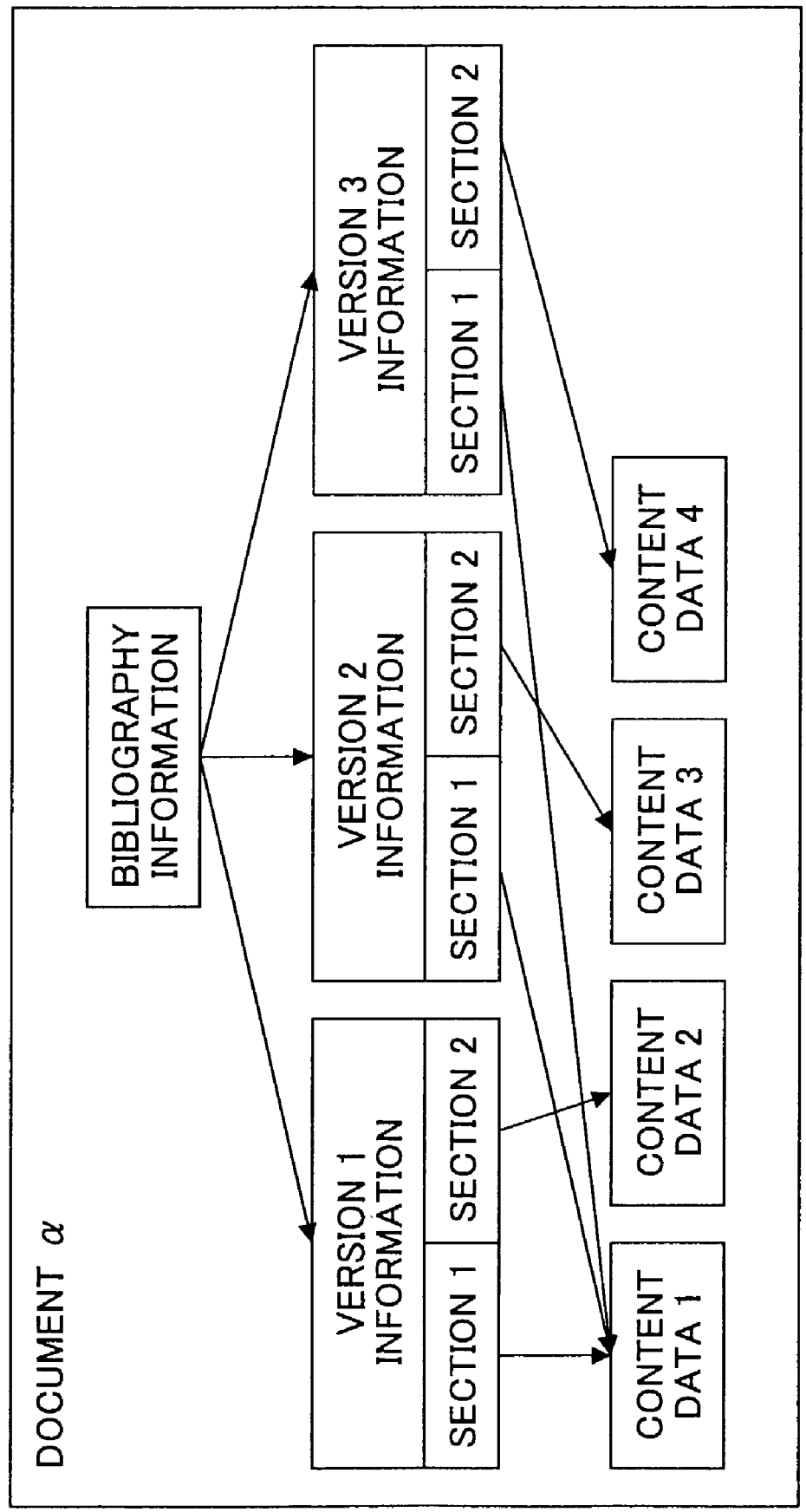
FIG. 3 is a block diagram showing a second version management structure according to the embodiment of the present invention.

FIG. 3 is a block diagram showing the second version management structure according to the embodiment of the present invention. FIG. 4A through FIG. 4D are diagrams showing databases realizing the second version structure shown in FIG. 3.

As shown in FIG. 3, in the second version structure for the document α, which is illustrated as a document having a plurality of versions and each version having a plurality of sections, the document α has versions 1 through 3, each version has sections 1 and 2, the section 1 of each version shares content data 1, the section 2 of the version 1 has content data 2, the section 2 of version 2 has content data 3, and the section 2 of version 3 has content data 4. That is, it is shown that the document α has the plurality of versions because of version 1 information concerning version 1, version 2 information concerning version 2, and version 3 information concerning version 3. The version 1 information, the version 2 information, and the version 3 information are related to the bibliography information. Moreover, by the content data 1 related to section information concerning each of sections 1 managed by the version 1 information, the version 2 information, and the version 3 information, the sections 1 of the version 1 through the version 3 share the same content data 1. And by the content data 2, 3, and 4 related to section information concerning each of sections 2 managed by the version 1 information, the version 2 information, and the version 3 information, the sections 2 of the version 1 through the version 3 have different content data 2, 3, and 4, respectively.

The second version management structure of the document α is ruled by tables of a bibliography information DB shown in FIG. 4A, a version information DB shown in FIG. 4B, a section information DB shown in FIG. 4C, and a content data DB shown in FIG. 4D. In FIG. 4A through FIG. 4D, different from the databases shown in FIG. 2A through FIG. 2C, the content ID is not managed in the version DB but is managed in the section information DB.

The document ID of the document α is "1" as shown in the bibliography information DB (FIG. 4A). And each version of the document is shown as a version number (1, 2, 3, . . . ) in the version information DB (FIG. 4B), and is managed by the version ID. The section information in each version is shown by the section number in the section information DB (FIG. 4C). The section number is sequentially determined in the version. Accordingly, by indicating the document and the version number, it is possible to indicate the content data related to the version of the document specified through the version ID and the section number by one section unit. In this case, since each content data can be shared with all sections among the plurality of versions, in order to reproduce the entire the document, the content data DB (FIG. 4D) is referred to through the content ID, the content data are retrieved from the content data DB by each section, and all content data for all sections are combined to reproduce and use a complete version. It should be noted that an item "ID" in each database shown in FIG. 4A through FIG. 4D is a unique number identifying a unique record in that database.

Figure 5:
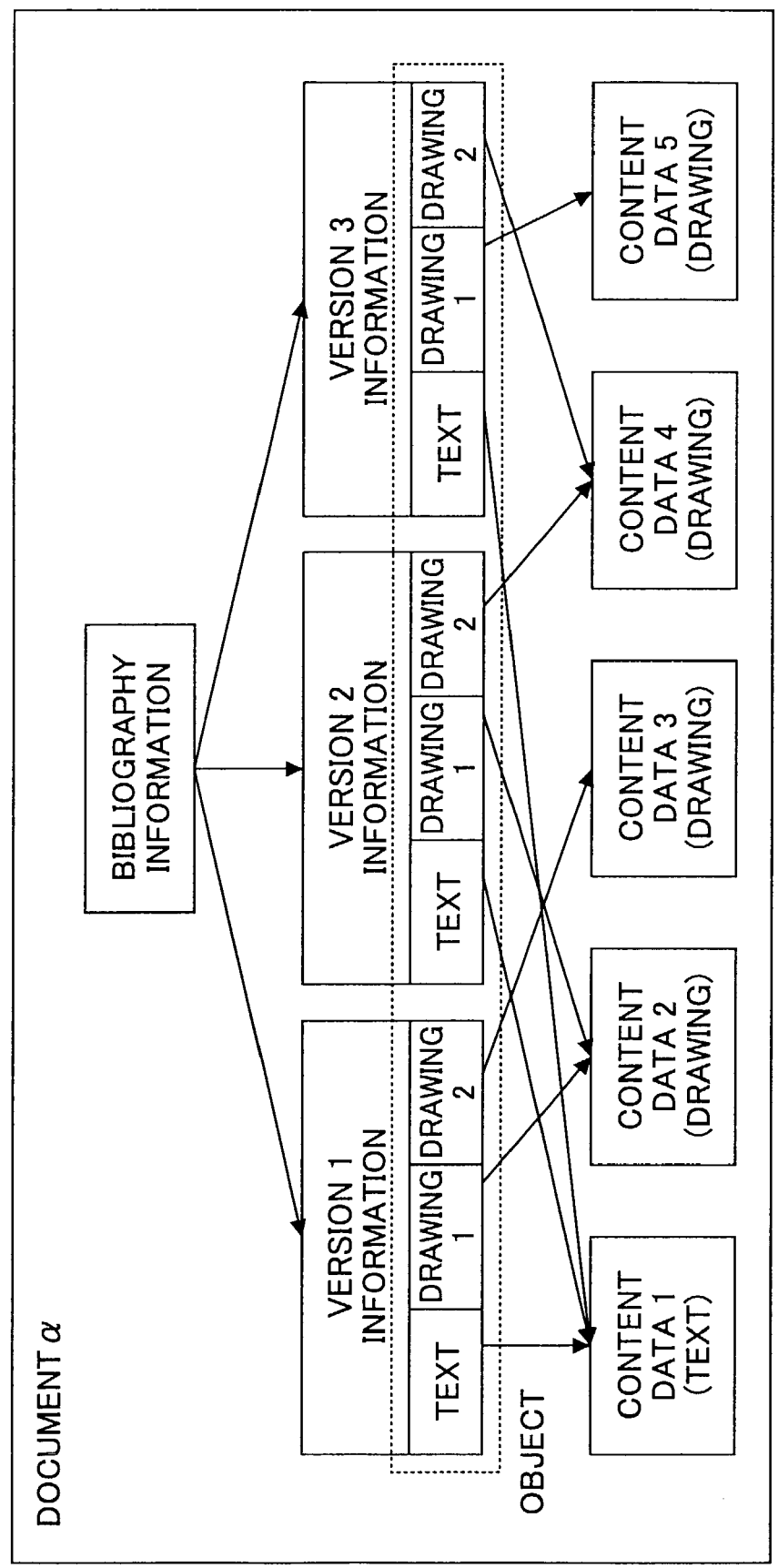
FIG. 5 is a block diagram showing a third version management structure according to the embodiment of the present invention.

In the second version management structure shown in FIG. 3, each of the sections configuring one document is defined as one unit of the contents of the document to manage the plurality of versions of the document. Alternatively, each of objects configuring one document can be defined as one unit of the contents of the document to manage the plurality of versions of the document. FIG. 5 is a block diagram showing a third version management structure according to the embodiment of the present invention.

As shown in FIG. 5, in the third version structure for the document α, which is illustrated as a document having a plurality of versions and each version having a plurality of objects, the document α has versions 1 through 3, each version has a text and drawings 1 and 2 as the plurality of objects, the text of each version shares content data 1, the drawings 1 of the versions 1 and 2 share content data 2, the drawing 2 of the version 1 uses content data 3, the drawings 2 of the versions 2 and 3 share content data 4, and the drawing 1 of the version 3 uses content data 5.

The third version management structure of the document α, is ruled by tables of the bibliography information DB shown in FIG. 4A, the version information DB shown in FIG. 4B, the content data DB shown in FIG. 4D, and an object DB shown in FIG. 6 instead of the section information DB shown in FIG. 4C. FIG. 6 is a diagram showing an object database to realize the third version management structure shown in FIG. 5. In FIG. 6, the object database (DB) includes items such as an object ID identifying an object, an object type showing the type of the object, a version ID identifying a record in the version information DB, a content ID identifying a content of the object corresponding to the version ID, and the like.

Similar to the second version management structure, the document ID of the document α indicates "1" as shown in the bibliography information DB (FIG. 4A). And each version of the document is shown as a version number (1, 2, 3, . . . ) in the version information DB (FIG. 4B), and is managed by the version ID. Object information in each version is shown by the object ID as shown in the object information DB (FIG. 6). The object ID is determined to uniquely identify the object in all versions. Accordingly, by indicating the document and the version number, it is possible to indicate the content data related to the version of the document specified through the version ID and the object number by one object unit. In this case, since each content data can be shared with all objects among the plurality of objects, in order to reproduce the entire document, the content data DB (FIG. 4D) is referred to through the content ID, the content data are retrieved from the content data DB by each object, and all content data for all objects are combined to reproduce and use a complete version.

Next, a functional configuration of the document processing apparatus for managing the document by using the first, the second, or the third version management structure will be described. The document processing apparatus manages the document to edit by using the first, the second, or the third version management structure in an apparatus capable of conducting an editing process. In the following, for the sake of convenience, the functional configuration and flowcharts in the first version management structure will be mainly described with reference to FIG. 7, FIG. 8, and FIG. 9. It should be noted that a similar functional configuration and flowcharts can be realized in the second and the third version management structures.

Figure 7:
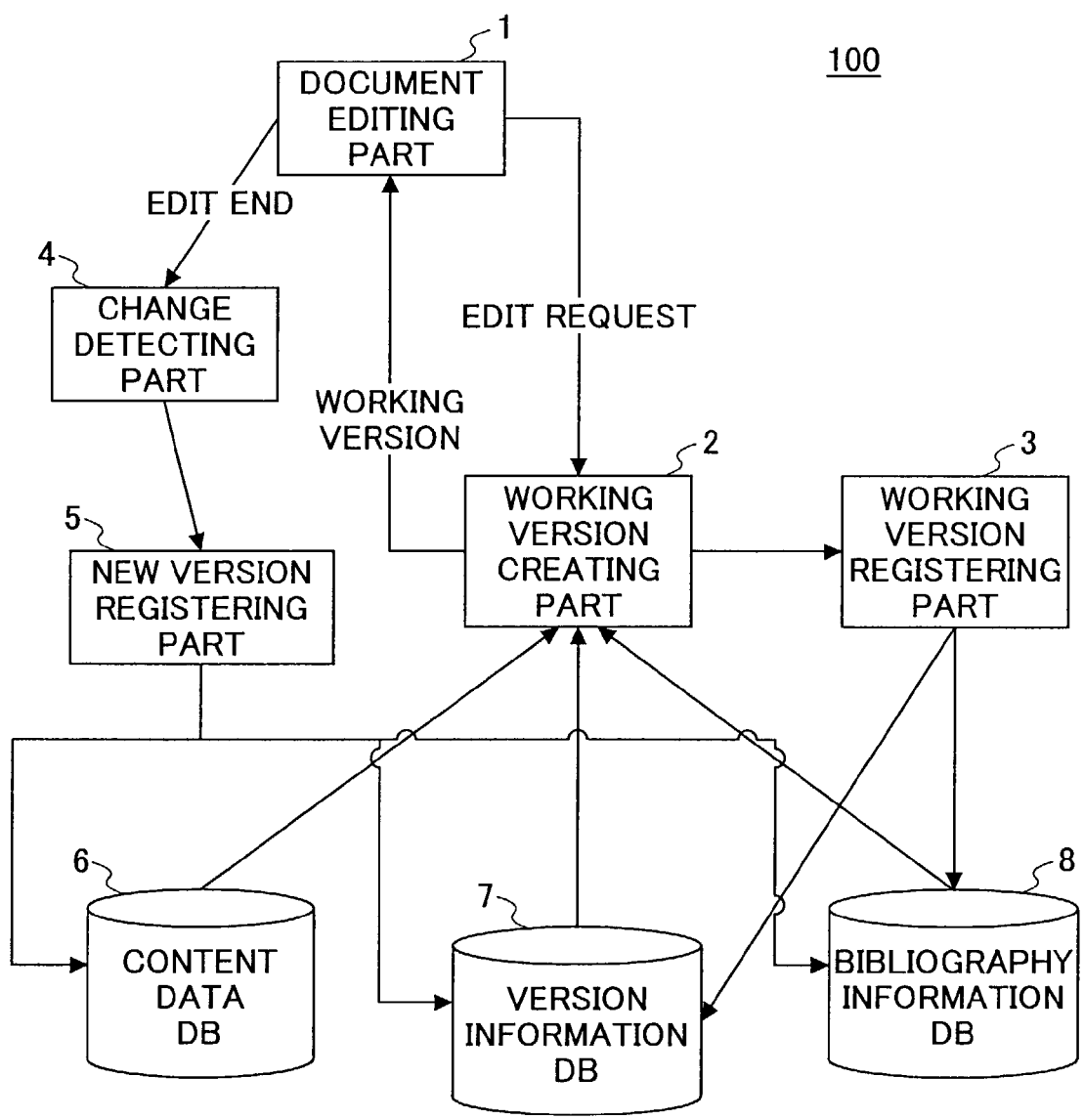
FIG. 7 is a block diagram showing a functional configuration of the document processing apparatus according to the embodiment of the present invention.

FIG. 7 is a block diagram showing the functional configuration of the document processing apparatus according to the embodiment of the present invention.

A document processing apparatus 100 as shown in FIG. 7 includes a document editing part 1, a working version creating part 2, a working version registering part 3, a change detecting part 4, a new version registering part 5, a content data DB 6, a version information DB 7, and a bibliography information DB 8.

The content data DB 6, the version information DB 7, and the bibliography information DB 8 accumulate data illustrated in FIG. 2A through FIG. 2C or FIG. 4A through FIG. 4D as databases realizing the first, the second, or the third version management structure. It should be noted that the section information DB in FIG. 4C is included in the version information DB 7. In a case of using the object information DB in FIG. 6 instead of the section information DB in FIG. 4C, the object information DB is also included in the version information DB 7. A process in the third version management structure in that one object is one unit of the contents of the document can be realized similar to that in the second version management structure in which one section is one unit of the contents of the document.

The document editing part 1 conducts the editing process such as changing, adding, and deleting the contents of the document. When an edit request is sent from the document editing part 1, the working version creating part 2 operates each of databases 6, 7, and 8 in accordance with the edit request, creates a working version of the document indicated by the edit request so that the document editing part 1 uses the working version to edit. After creating the working version, the working version creating part 2 sends the working version to the document editing part 1. The edit request to create the working version indicates the document and the version. In accordance with an indication of the document and the version, the working version creating part 2 retrieves the content data corresponding to an indicated version by using the first, the second, or the third version management structure from the content data DB 6, and creates the working version. When the working version creating part 2 creates the working version, the working version registering part 3 registers information concerning the document as working version information. That is, the working version registering part 3 registers the information to the version information DB 7 and the bibliography information DB 8. Therefore, it is possible to share the content data used for the editing process.

After the document editing part 1 completes the editing process, the change detecting part 4 determines whether or not the content data are changed. That is, the change detecting part 4 compares the original content data of the version of the document (That is, the version of the document that the working version creating part 2 requests in order to conduct the editing process), and detects differences. When the new version is created, the new version registering part 5 creates and registers new version information to the version information DB 7. It is essential to register the new version information. A registration to the content data DB 6 is conducted in response to a detection result of the change detecting part 4. When it is determined that there are changes, new content data need to be registered. When it is determined that there is no change (in a case of sharing the content data), only new version information is registered but it is not needed to register new content data.

Next, a registering process for registering the working version information in the document processing apparatus 100 in FIG. 7 will be described in detail.

Figure 8:
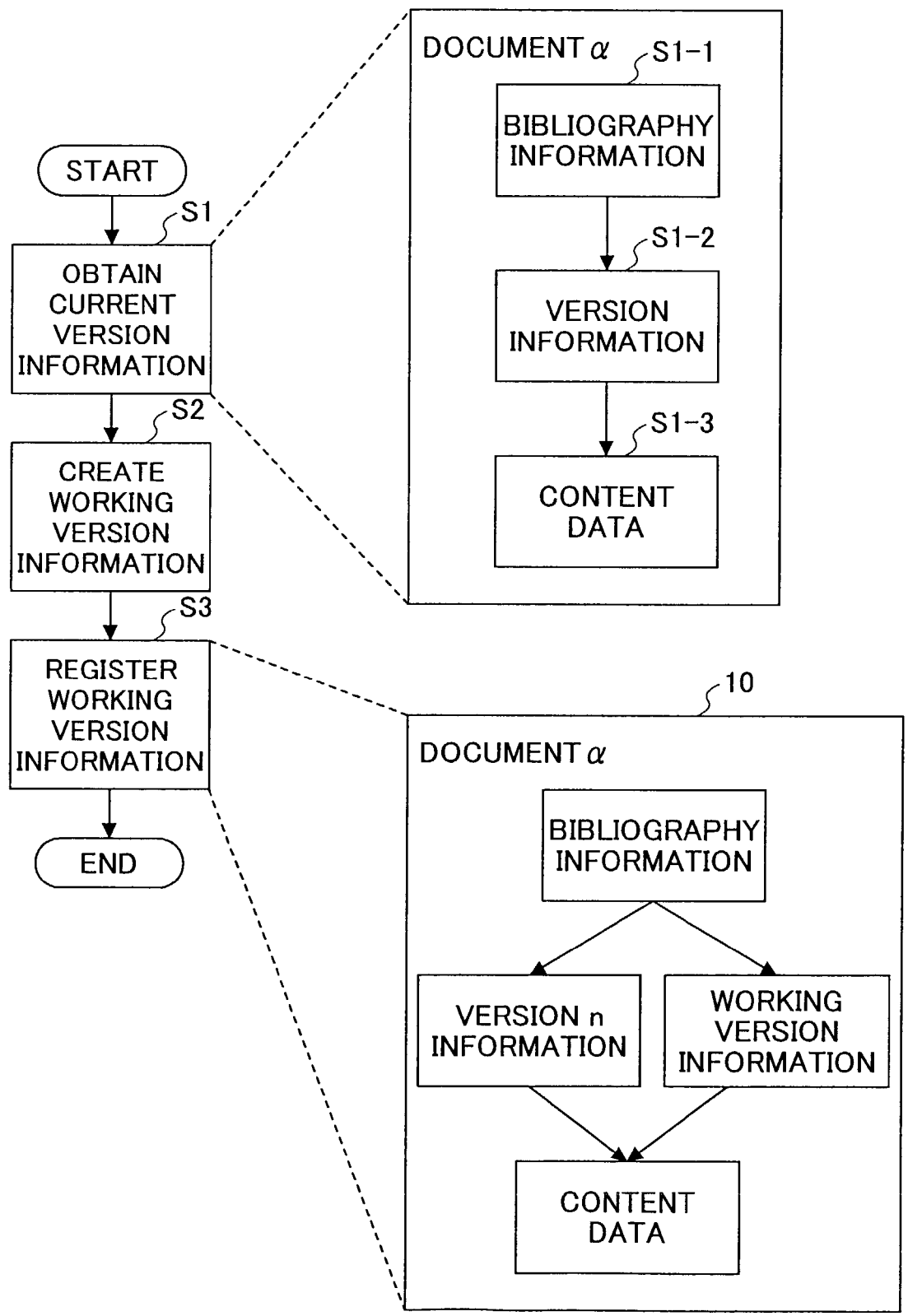
FIG. 8 is a flowchart for explaining the registering process for registering the working version information according to the embodiment of the present invention.

FIG. 8 is a flowchart for explaining the registering process for registering the working version information according to the embodiment of the present invention. First, referring to FIG. 8, when receiving the edit request from the document editing part 1, the working version creating part 2 obtains current version information of the document indicated by the edit request (step S1). The document is indicated by the document and the version. For example, when "the version 2 of the document α" is indicated by a user, the working version creating part 2 obtains the document ID "1" corresponding to the document α from the bibliography information DB 8 in accordance with the first version management structure shown in FIG. 1 and FIG. 2 (step S1-1). Subsequently, the working version creating part 2 searches the version information DB 7 and obtains the content ID "1" corresponding to the document ID "1" obtained in the step S1-1 and the version number "2" indicated by the edit request. Moreover, the working version creating part 2 searches the content data DB 8 and obtains the content data corresponding to the content ID "1" obtained in the step S1-2 (step S1-3). In a case of the second version management structure shown in FIG. 3 and FIG. 4, a step is additionally provided to correlate the section information to the content ID in the step S1-2.

The working version creating part 2 reproduces the document based on the version information and the content data obtained in the step S1 and sends the document as a working version to the document editing part 1. Also, the working version creating part 2 sends the version information as management information of the working version created in the step S1, and the working version registering part 3 registers the version information to the version information DB 7 and the bibliography information DB 8, so that the document to be edited is managed in a state in that content data are still shared. Accordingly, the content data for the working version are copied to a working space used by the document editing part 1 for the user and remain in a state wherein the user can edit the content data, but the content data for the working version are not registered to the content data DB 6.

In the flowchart in FIG. 8, the working version creating part 2 creates the working version information based on the version information obtained in the step S1-2 (step S2), and sends the working version information to the working version registering part 3.

The working version registering part 3 receiving the working version information registers the working version information to the version information DB 7 and the bibliography information DB 8, and provides additional data so as to achieve a database capable of realizing the first version management structure including the working version information (step S3). In the first version management structure in which the working version information is registered as described above, the working version information shares the content data for a version n with version n information of the version that is originally indicated in the edit request and is to be edited, as shown in a version management structure example 10 including the working version information in FIG. 8. After the working version information is registered in the version information DB 7, the registering process for registering the working version information is terminated.

Next, a registering process for registering version information after the editing process in the document processing apparatus in FIG. 7 will be described in detail.

Figure 9:
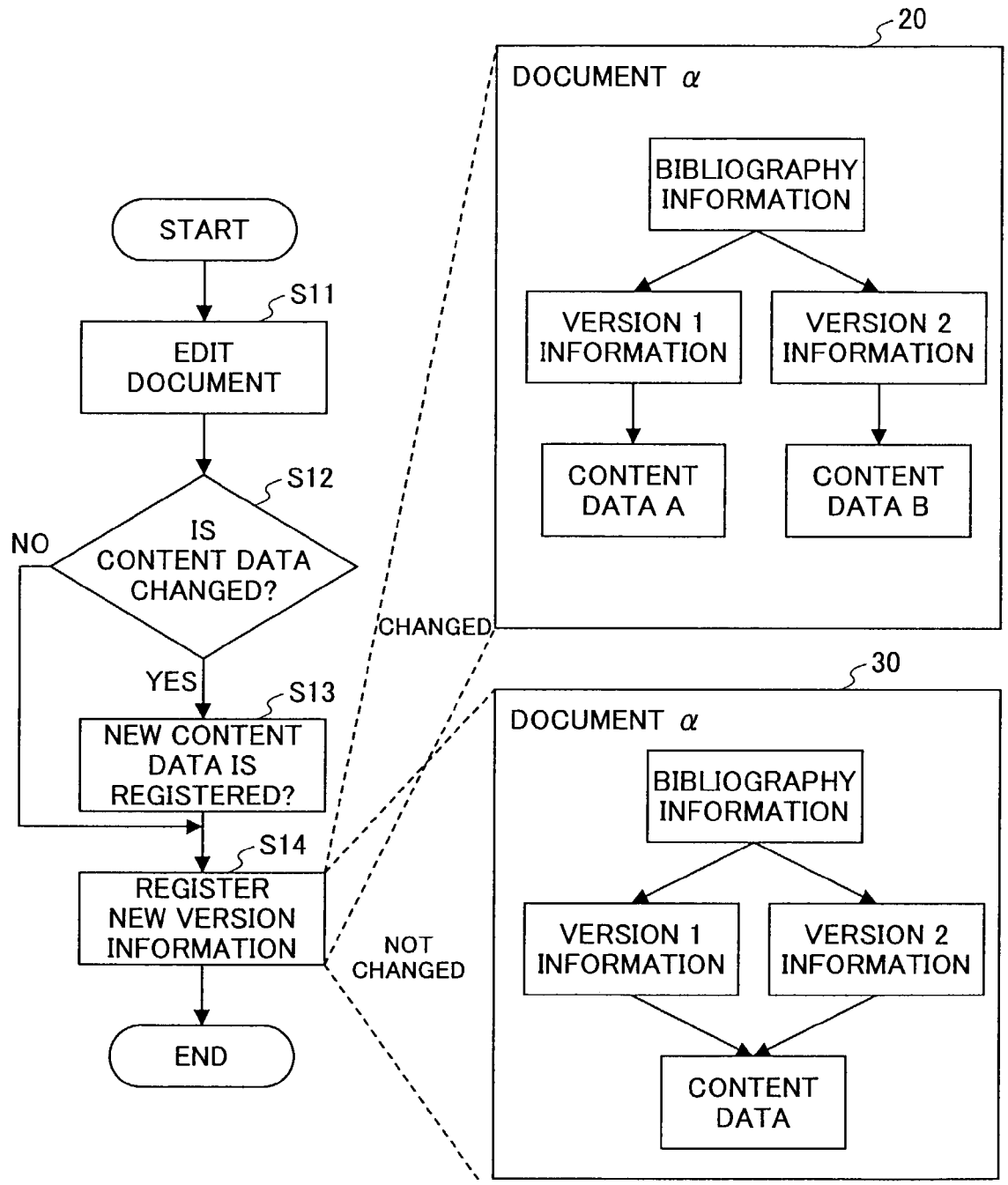
FIG. 9 is a flowchart for explaining the registering process for registering the version information after the editing process according to the embodiment of the present invention.

FIG. 9 is a flowchart for explaining the registering process for registering the version information after the editing process according to the embodiment of the present invention.

Referring to FIG. 9, the document editing part 1 retrieves the document from the content data DB 6 by indicating the document and the version as a working version, and conducts the editing process in respect to the document in the working space of the user by using editing software (editor) (step S11). When the editing process completes, the document editing part 1 registers the management information such as the version information and the like to manage the edited document as a new version.

In this case, since the registering process in FIG. 9 is branched based on whether or not the content of the version originally indicated in the edit request is changed, the change detecting part 4 determines based on a result of the editing process whether or not the content data of the new version are different from the original content data of the version indicated in the edit request (step S12).

When it is determined that there are changes in the content data of the new version (YES in the step S12) the new version registering part 5 registers the content data of the new version to the content data DB 6 with the content ID (step S13), and subsequently registers the version information concerning the new version (step S14). When the content data of the new version have changes, the change detecting part 4 creates new version information corresponding to the content data (registered in step S14) of the new version received from the document editing part 1 and sends the new version information to the new version registering part 5. The version information created at this time includes a new version number relating to the document managed as the bibliography information, and the content ID of the new content data registered by relating to the version number. It is possible to realize the first version management structure including the new version information by adding and registering the new version information to the version information DB 7 and the bibliography information DB 8. In the first version managing structure in which the new version information is registered as illustrated in a version management structure example 20 in FIG. 9, the new version (version 2 in this case) information belongs to the same bibliography information as the version (version 1 in this case) information originally indicated in the edit request, and each version includes separate content data A and B. After the new version information is registered in each of the content data DB 6, the version information DB 7, and bibliography information DB 8 as described above, the registering process for registering the working version information is terminated.

As a determination result in the step S12, when the content data are not changed (NO in the step S12), since the new version registering part 5 uses (shares) the content data being registered in the content data DB 6 as the new version, only the version information of the new version is registered (step S14). For example, the bibliography information is changed because of a change concerning an author, but the contents of the document have not changed. In this case, the version number is incremented because of the changes of the bibliography information. When the content data of the new version are not changed, the change detecting part 4 creates new version information in respect to the new version and sends the new version information to the new version registering part 5. The new version information created by the change detecting part 4 includes the new version number associated with the document to be edited and the content ID being registered for the content data that are related to the version number and are shared.

By adding and registering the new version information to the version information DB 7 and the bibliography information DB 8, it is possible to realize the first version management structure including the new version information. As illustrated in a version management structure example 30 in FIG. 9, the new version (version 2 in this case) information belongs to the same bibliography information as the version (version 1 in this case) information of the version originally indicated in the edit request, and the content data related to the new version information are shared among different versions of the document. After the new version information is registered to the version information DB 7 and the bibliography information DB 8 as described above, the registering process for registering the working version information is terminated.

The document processing apparatus 100 including the functional configuration shown in FIG. 7 includes a hardware configuration as shown in FIG. 10. In FIG. 10, the document processing apparatus 100 is a computer, and includes a CPU (Central Processing Unit) 21, a memory unit 22, an output unit 23, an input unit 24, a display unit 25, a storage unit 26, a drive unit 27, and a communication unit 28. The CPU 21 and each of the units 22 through 28 are mutually connected via a bus B.

The CPU 21 controls the document processing apparatus 100 in accordance with a program stored in the memory unit 22, and conducts the version management process described above. The memory unit 22 includes a RAM (Random Access Memory) and a ROM (Read-Only Memory), and stores the program executed by the CPU 21, data necessary for a process by the CPU 21, data obtained by the process by the CPU 21, and the like. Also, the memory unit 22 is partially used as a work area for the CPU 21.

The output unit 23 includes a printer or the like, and outputs information showing a process result or as instructed by the CPU 21. The input unit 24 includes a mouse, a keyboard, and the like, and is used to input various information necessary for conducting the version management process. The display unit 25 displays various information needed by the user under control of the CPU 21.

For example, the storage unit 26 includes a hard disk unit, and stores the content data DB 6, the version information DB 7, the bibliography information DB 8, the program, and the like.

For example, the program can be provided to the document processing apparatus 100 by a recording medium 30 such as a CD-ROM (Compact Disc Read-Only Memory) or the like. That is, when the recording medium 30 recording the program according to the version management process is inserted in the drive unit 27, the drive unit 27 reads the program from the recording medium 30, the program read from the recording medium 30 is installed to the storage unit 26 via the bus B. Then, when the version management process is executed, the CPU 21 starts the process in accordance with the program installed to the storage unit 26. By the program installed from the recording medium 30 to the document processing apparatus 100, the document editing part 1, the working version creating part 2, the working version registering part 3, the change detecting part 4, and the new version registering part 5 configure a part of the document processing apparatus 100. It should be noted that the recording medium 30 is not limited to a CD-ROM, but any medium readable for the computer may be used as the recording medium 30.

The communication unit 28 conducts communication control between the document processing apparatus 100 and a plurality of terminals in a case in that the document processing apparatus 100 functions as a server computer and connects to a plurality of terminals through a LAN (Local Area Network) and the like. In this case of configuring a network with the plurality of terminals, the document processing apparatus 100 can realize the version management process as a single apparatus, and also can conduct the version management process in response to requests from the plurality of the terminals.

According to the embodiment of the present invention, first, the contents of each document are related to the plurality of version information, and the content of the document indicated by the user are retrieved from a database accumulating a plurality of documents based on the version information. Accordingly, the contents of the document are shared among different versions. In the document processing apparatus for processing a document having a plurality of versions, it is not needed to store the contents (content data) of the document, which are relatively a greater amount than the bibliography data, which are managed for each version. Therefore, the storage area used to store the content data can be reduced and also the document management including version management can be conducted by a simple means.

Second, in addition to the above-described first advantage, since the contents of the document are managed by each of sections configuring the document so that the contents of the document can be shared by segmented units, it is possible to flexibly share the contents of the document and to further reduce the storage area.

Third, in addition to the above-described first advantage, since the contents of the document are managed by each of objects, configuring the document so that the contents of the document can be shared by segmented units, it is possible to flexibly share the contents of the document and to further reduce the storage area.

Fourth, in addition to the above-described first, second, and third advantages, since the contents of the document retrieved from the database accumulating the contents of the document are related to new version information to create a working version used to edit the document so that the contents of the document are shared, it is possible to suppress increasing the storage area for editing the contents of the document and then to reduce the storage area. That is, even when the version number is increased when the document is being edited, there is a case in which the contents of the document are not changed after the document is edited. It is not known whether or not the content of the document will be changed at a beginning time of editing the document. If the contents of the document are stored in the storage area as working contents to edit, the storage area is unnecessarily used when the contents of the document are not changed. Therefore, by sharing the contents of a previous version of the document at the beginning time of editing the document, it is possible to reduce the storage area.

Fifth, in addition to the above-described first through fourth advantages, since in respect to the document created as a new version as a result of editing the document, duplicating the same contents of the document are eliminated while accumulating and managing the contents of the document as the new version, it is possible to reduce the storage area when the new version of the document is managed. That is, there is a case in which even if the version number is incremented after the document is edited, the contents of the document have not been changed. The storage area is reserved to store new contents of the document when the contents of the document are changed. However, the contents of the previous version of the document are shared when the contents of the document are not changed. Therefore, it is possible to reduce the storage area.

The present invention is not limited to the specifically disclosed embodiments, and variations and modifications may be made without departing from the scope of the present invention.

The present application is based on the Japanese priority applications No. 2001-356160 filed on Nov. 21, 2001 and No. 2002-321629 filed on Nov. 5, 2002, the entire contents of which are hereby incorporated by reference.

What is claimed is:

1. A document processing apparatus for managing a document having a plurality of versions, comprising:
   a version managing part managing the plurality of versions so as to share a part of an entire actual data showing contents of the document with the plurality of versions for each document;
   a change detecting part configured to separately detect a change state to said actual data and bibliography information associated with said document; and
   a working version creating part obtaining the actual data from said version managing part by document identification information identifying the document and version identification information identifying the version, and reproducing the contents of the document as a working version,
   wherein said version managing part manages the document so that the actual data is formed as a new version and is partially or entirely shared with the plurality of versions of the document based on said detected change state of the document such that only one copy of the shared actual data is stored by said apparatus, and
   wherein said version managing part comprises:
      a bibliography information managing part managing bibliography information showing a bibliography for each document;
      a version information managing part, which is related to said bibliography information managing part by the document identification information, managing actual data identification information identifying the actual data specified by the document identification information and a version number; and
      an actual data managing part, which is related to said version information by the actual data identification information, managing the actual data.

2. The document processing apparatus as claimed in claim 1, wherein said version managing part manages the plurality of versions so as to share the part of or the entire actual data of the document with the plurality of versions for each of a plurality of sections sectioning the document.

3. The document processing apparatus as claimed in claim 2, wherein said version managing part further comprises:
   a section information managing part managing a correspondence between each of the sections and the actual data so as to indicate actual data identification information identifying the actual data by each section number of the plurality of sections configuring the document and the document version specification information, wherein said actual data managing part is related to said section information managing part by the actual data identification information and manages the actual data.

4. The document processing apparatus as claimed in claim 1, wherein said version managing part manages the plurality of versions so as to share the part of the entire actual data of the document with the plurality of versions for each of a plurality of objects embedded in the document.

5. The document processing apparatus as claimed in claim 4, wherein said version managing part further comprises:
   an object information managing part corresponding and managing each type of the plurality of objects configuring the document, said document specification information, and actual data identification information identifying the actual data, wherein said actual data managing part is related to said object information managing part by the actual data identification information and manages the actual data.

6. The document processing apparatus as claimed in claim 1, further comprising a working version registering part registering document identification information identifying the document and version identification information identifying the version as a working version of the document,
   wherein said working version creating part reproduces and registers the contents of the document in response to an edit request specifying the document and the version.

7. The document processing apparatus as claimed in claim 1, further comprising:
   a change determining part determining whether or not the contents of the document reproduced by said working version creating part are changed; and
   a new version registering part registering a new version to said version managing part,
   wherein when said change determining part determines that the contents of the document are not changed, said new version registering part registers said new version to said version managing part so as to relate the new version to a data set of the actual data, the data set being used when the working version creating part reproduces the document.

8. The document processing apparatus as claimed in claim 7, wherein when the said change determining part determines that the contents of the document are changed, said new version registering part registers the new version to the said version managing part so as to relate the new version to new actual data after the actual data are changed.

9. A computer program product stored on a computer readable storage medium for carrying out code comprising:
   first code for managing the plurality of versions so as to share actual data showing contents of the document among the plurality of versions for each document;
   second code for obtaining the actual data from a version managing part by document identification information identifying the document and version identification information identifying the version;
   third code for separately detecting a change state to said actual data and bibliography information associated with said document; and
   fourth code for reproducing the contents of the document as a working version,
   wherein said first code manages the document so as to share the actual data as a new version based on a change state of the document that is enabled to be changed by said third code, and wherein said version managing part comprises:
   a bibliography information managing part managing bibliography information showing a bibliography for each document;

a version information managing part, which is related to said bibliography information managing part by the document identification information, managing actual data identification information identifying the actual data specified by the document identification information and a version number; and an actual data managing part, which is related to said version information by the actual data identification information, managing the actual data such that only one copy of the shared actual data is stored by said apparatus.

10. A computer-readable recording medium recorded with program code for causing a computer to manage a document having a plurality of versions, comprising:

first code for managing the plurality of versions so as to share actual data showing contents of the document among the plurality of versions for each document;

second code for obtaining the actual data from a version managing part by document identification information identifying the document and version identification information identifying the version;

third code for separately detecting a change to said actual data and bibliography information associated with said document; and fourth code for reproducing the contents of the document as a working version, wherein said first code manages the document so as to share the actual data as a new version based on a change state of the document that is enabled to be changed by said third code, and wherein said version managing part comprises:

a bibliography information managing part managing bibliography information showing a bibliography for each document;

a version information managing part, which is related to said bibliography information managing part by the document identification information, managing actual data identification information identifying the actual data specified by the document identification information and a version number; and an actual data managing part, which is related to said version information by the actual data identification information, managing the actual data such that only one copy of the shared actual data is stored by said apparatus.

* * * * *